March 27, 1928.  1,664,374

L. G. DANIELS

MULTIPLE SPINDLE MACHINE

Filed Jan. 23, 1924  6 Sheets-Sheet 1

Inventor

Lee G. Daniels

By Chamberlain & Newman

Attorneys

Inventor
Lee G Daniels
By Chamberlain & Newman
Attorneys

March 27, 1928. 1,664,374
L. G. DANIELS
MULTIPLE SPINDLE MACHINE
Filed Jan. 23, 1924  6 Sheets-Sheet 6
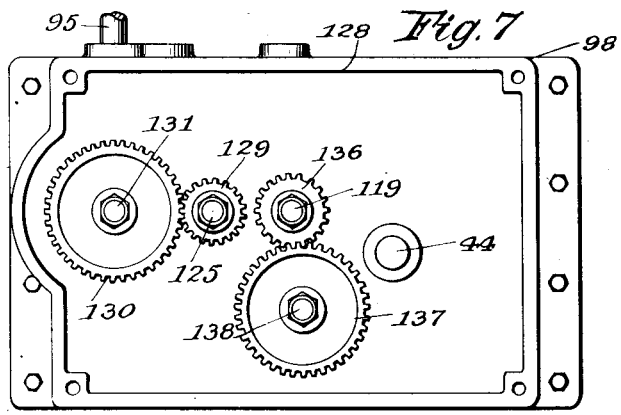
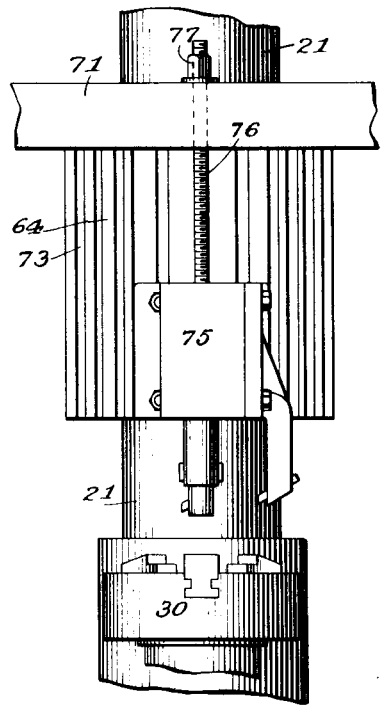
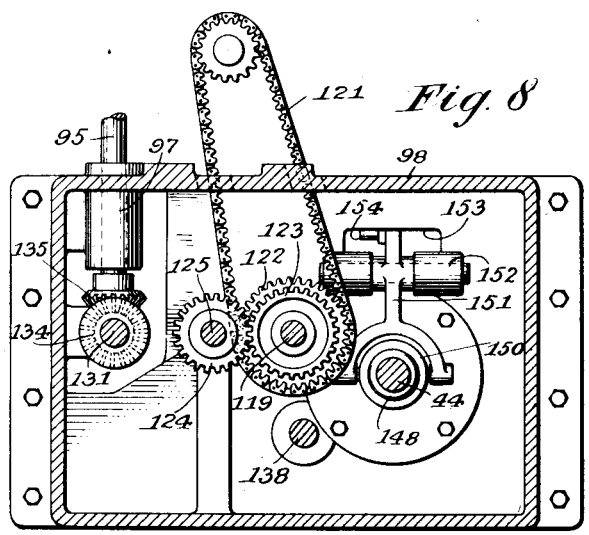
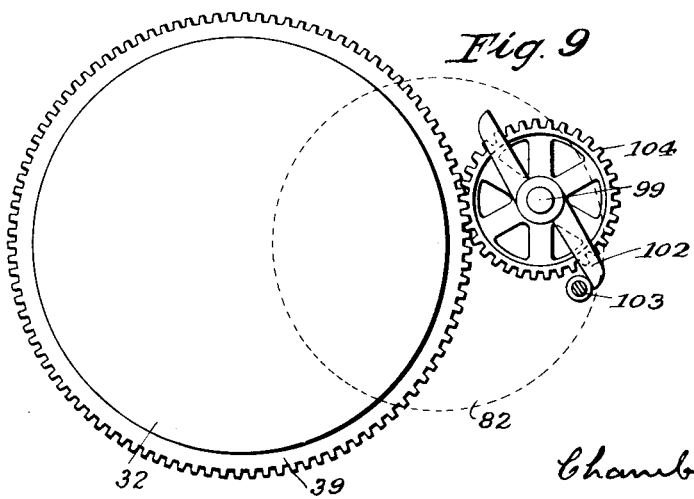
INVENTOR
Lee G. Daniels
BY
Chamberlain + Newman
ATTORNEYS Patented Mar. 27, 1928.

1,664,374

UNITED STATES PATENT OFFICE.

LEE G. DANIELS, OF ROCKFORD, ILLINOIS, ASSIGNOR TO THE BULLARD MACHINE TOOL CO., OF BRIDGEPORT, CONNECTICUT, A CORPORATION OF CONNECTICUT.

MULTIPLE-SPINDLE MACHINE.

Application filed January 23, 1924.. Serial No. 688,019.

This invention relates to an improved automatic multiple spindle chucking machine particularly of the type that revolves the work, and in which a plurality of rotary chucks are intermittently moved from one work station to another, and are rotated at such stations in co-operation with tools mounted on a tool carrier which moves into and out of relation with the chucks.

An object of the invention is to provide a machine of this character adapted to be operated mechanically and preferably from a single source of power, and which will be positive, reliable, and accurate in operation.

In particular, it is proposed to provide in the present invention a machine of this type employing a single cam positioned above the tool carrier for operating the same and also for operating the locking pin and indexing mechanism, thus providing a single element for performing the several operations of the machine.

Another object is to provide actuating means, of a positive and simple nature as distinguished from machines employing pressure systems for instance, in which the maintenance cost is great, requiring constant attention, and which are subject to frequent derangement.

It is also an object to provide improved chuck driving means by means of which the rotatable chucks will be quickly and positively stopped and started, and in which the chucking gears which mesh during the operation of the chuck spindles will be automatically stopped against rotation during each indexing period so that upon remeshing of the gears chattering and the danger of breakage or chipping is eliminated.

A further object is to provide for the positive regulation and adjustment of the relative speeds of the several moving elements, to the end that work of widely varying requirements may be carried out upon the same machine.

Other objects are compactness, accessibility and freedom from parts or mechanisms which will readily go out of order.

With the above and other objects in view an embodiment of the invention is shown in the accompanying drawings and this embodiment will be hereinafter more fully described with reference thereto, and the invention will be finally pointed out in the claims.

Figure 3:
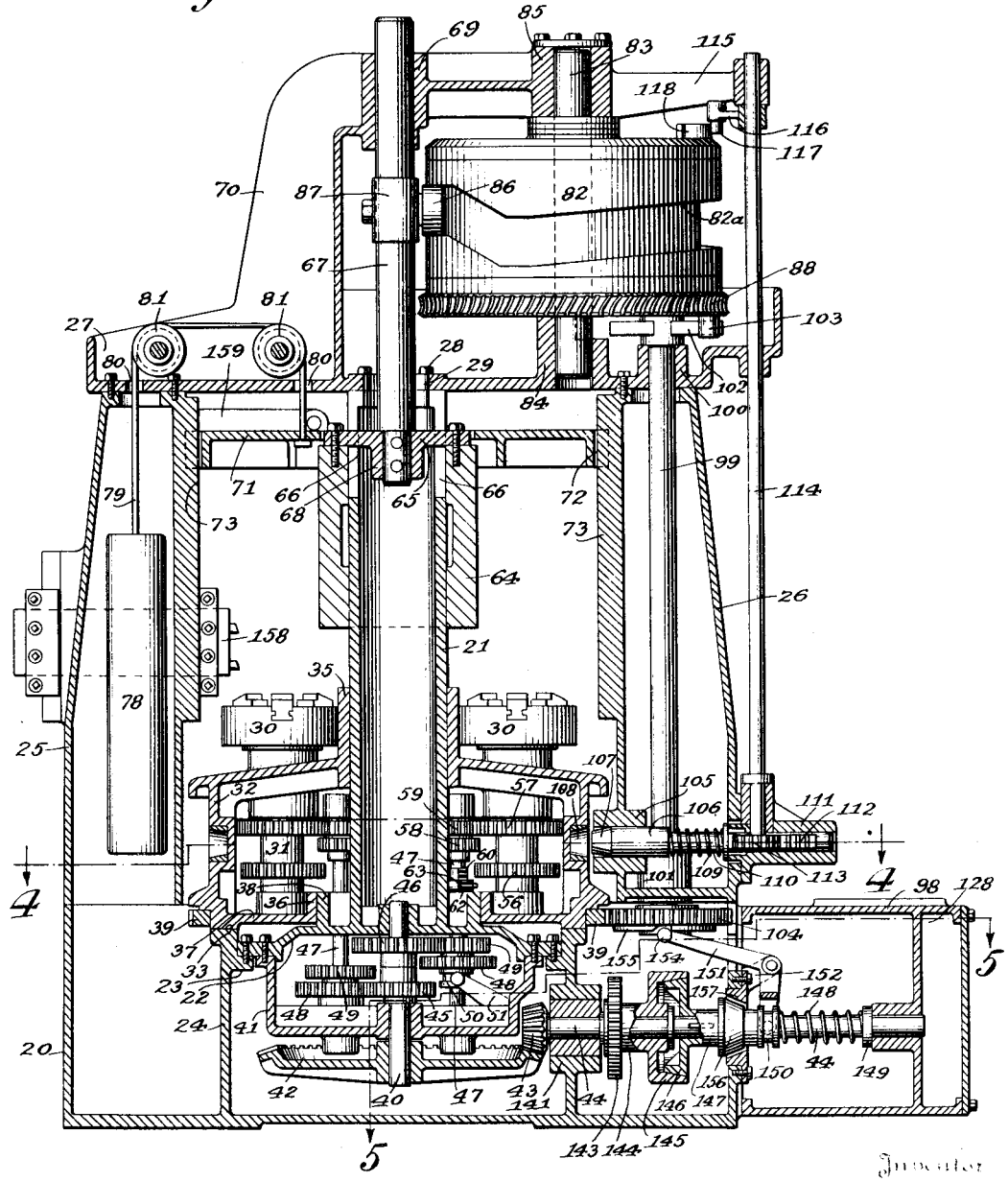
Fig. 3 is a central vertical sectional view looking to the rear of the machine as seen in Fig. 1.
Figure 4:
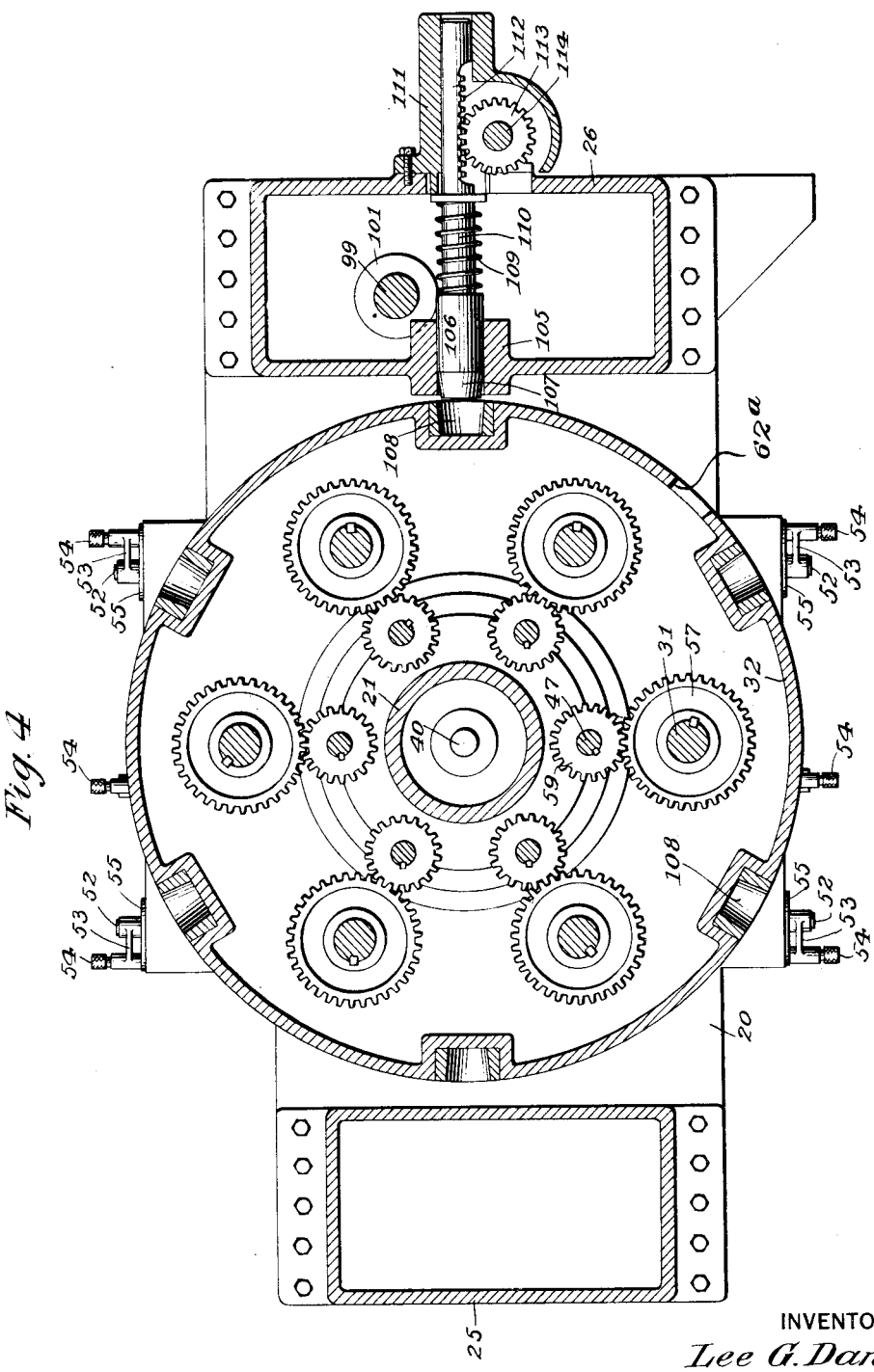
Figure 5:
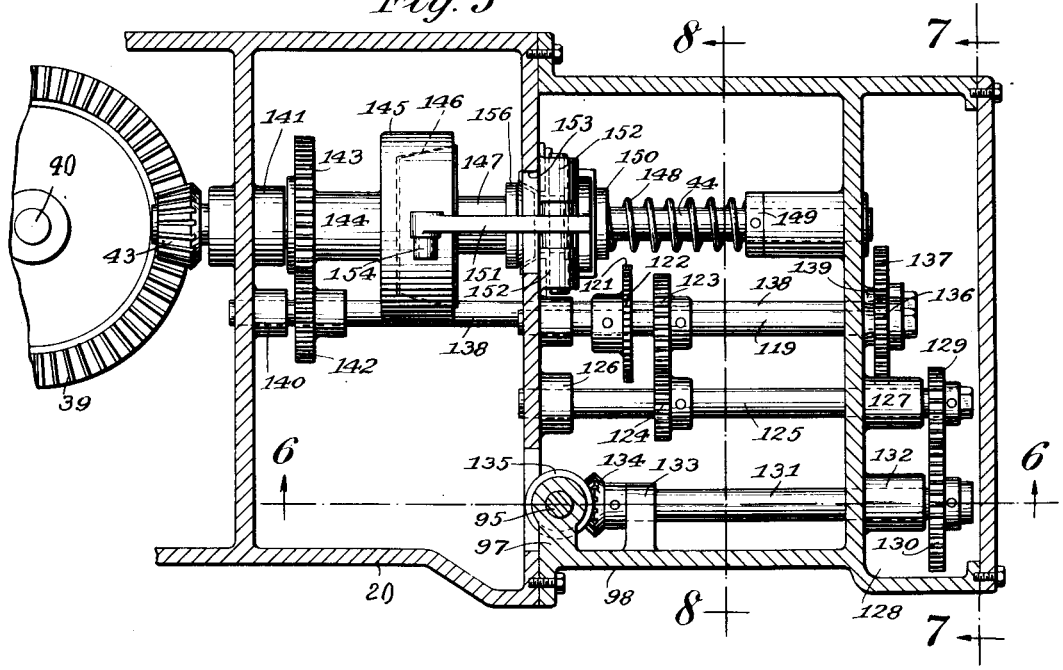
Figure 6:
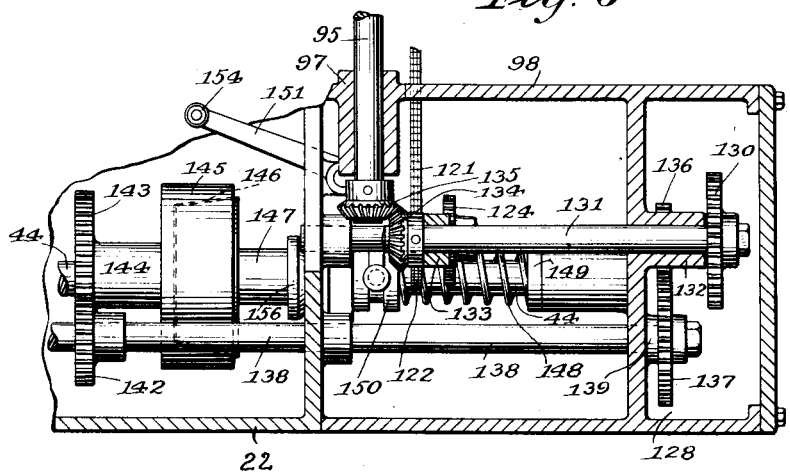

Fig. 3ª is a detail sectional plan view of a gear shifting device employed;

Fig. 4 is a horizontal sectional view taken along line 4—4 of Fig. 3 through the several work spindles and co-operating parts for operating the same, and especially illustrating the novel form of lock pin mechanism for the rotatable work carrier;

Fig. 5 is a horizontal sectional view taken along line 5—5 of Fig. 3 and showing the gear train and clutch mechanism employed;

Fig. 6 is a vertical longitudinal sectional view through the gear box and taken along line 6—6 of Fig. 5;

Fig. 7 is an end elevation of the gear box taken along line 7—7 of Fig. 6, the closure plate therefor being removed and showing the change gears employed;

Fig. 8 is a vertical transverse sectional view through the gear box and taken along line 8—8 of Fig. 5;

Fig. 9 is a diagrammatical plan view of the connection as between the cam carrier, the chuck carrier and the indexing mechanism for same; and Fig. 10 is an enlarged front elevation of the tool carrier having a series of tools mounted thereon, and showing one of the rotatable work carrying chucks in relation thereto.

Similar reference characters indicate corresponding parts throughout the several figures of the drawings.

Referring to the drawings, the main frame of the machine comprises a base 20 of hollow form, and a central vertical cylindrical column 21 of hollow form, having its base 22 resting upon and secured to a flange 23 provided upon a circular supporting wall 24 formed integrally within the base 20. At each side of the central column 21 and secured to the base 20 there are provided a pair of vertical hollow standards 25 and 26, upon the upper ends of which there is secured a stationary super-structure 27, the central column 21 being bolted to said structure, as at 28, and the base of the superstructure having an opening 29 therein in continuation of the hollow interior of said column.

The chucks 30 and their spindles 31 are rotatably mounted in radially spaced relation upon a rotatable chuck or work carrier 32, of the turret type, and which surmounts the base 20, being seated at 33 upon the upper bearing surface of the cylindrical wall 24. The work carrier also has a cylindrical relatively long bearing 35 engaging the column 21, and an annular cylindrical bearing 36 at the inner periphery of its horizontal base portion 37, and engaging an annular bearing rib 38 formed upon the base 22 of the column. The work carrier is provided at its outer periphery with a ring gear 39 adapted, as will hereinafter more fully appear, to be meshed by indexing mechanism for imparting an intermittent step-by-step rotary movement to the carrier and to bring the chucks successively into relation with the several work stations. During the periods that the chucks are in relation to the work stations they are rotated by gear mechanism presently to be described, this mechanism being such that during the movement between stations the chucks are stopped from rotating to prevent any clashing of the gears as they come into meshing relation.

This mechanism is mounted within the base 20 and at the lower side of the base 22 of the column 21 and comprises a vertical shaft 40 journaled in the base of the column 21 and in a depending bracket 41 secured to the base 22, and being provided at its lower end with a relatively large beveled gear 42 with which a driving pinion 43 meshes, this pinion being mounted upon a shaft 44 journaled within the base, and which is driven during the working periods by means of clutch mechanism hereinafter more fully described.

Figure 1:
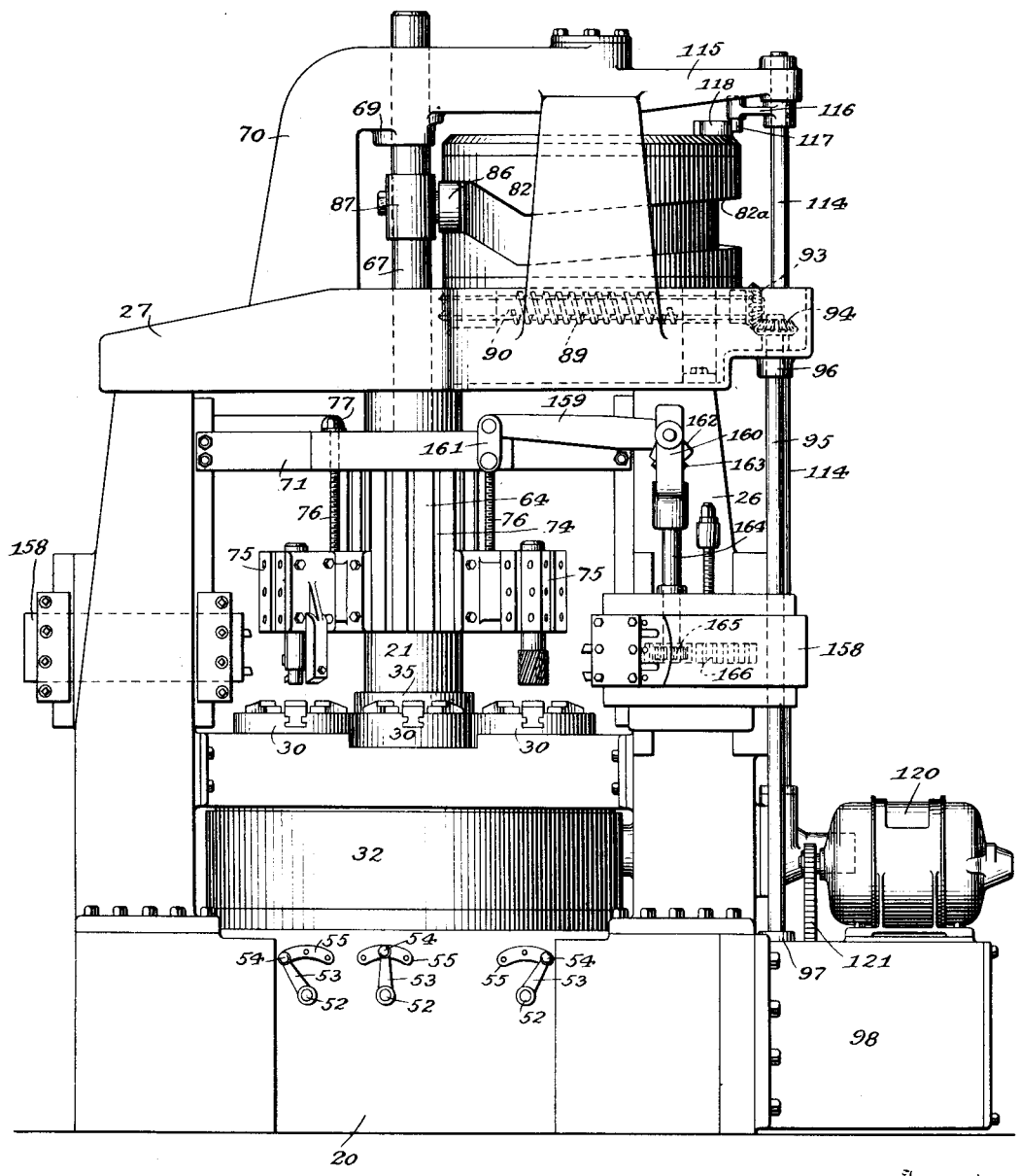
Fig. 1 is a front elevation of a machine according to the present embodiment of the invention.
Figure 2:
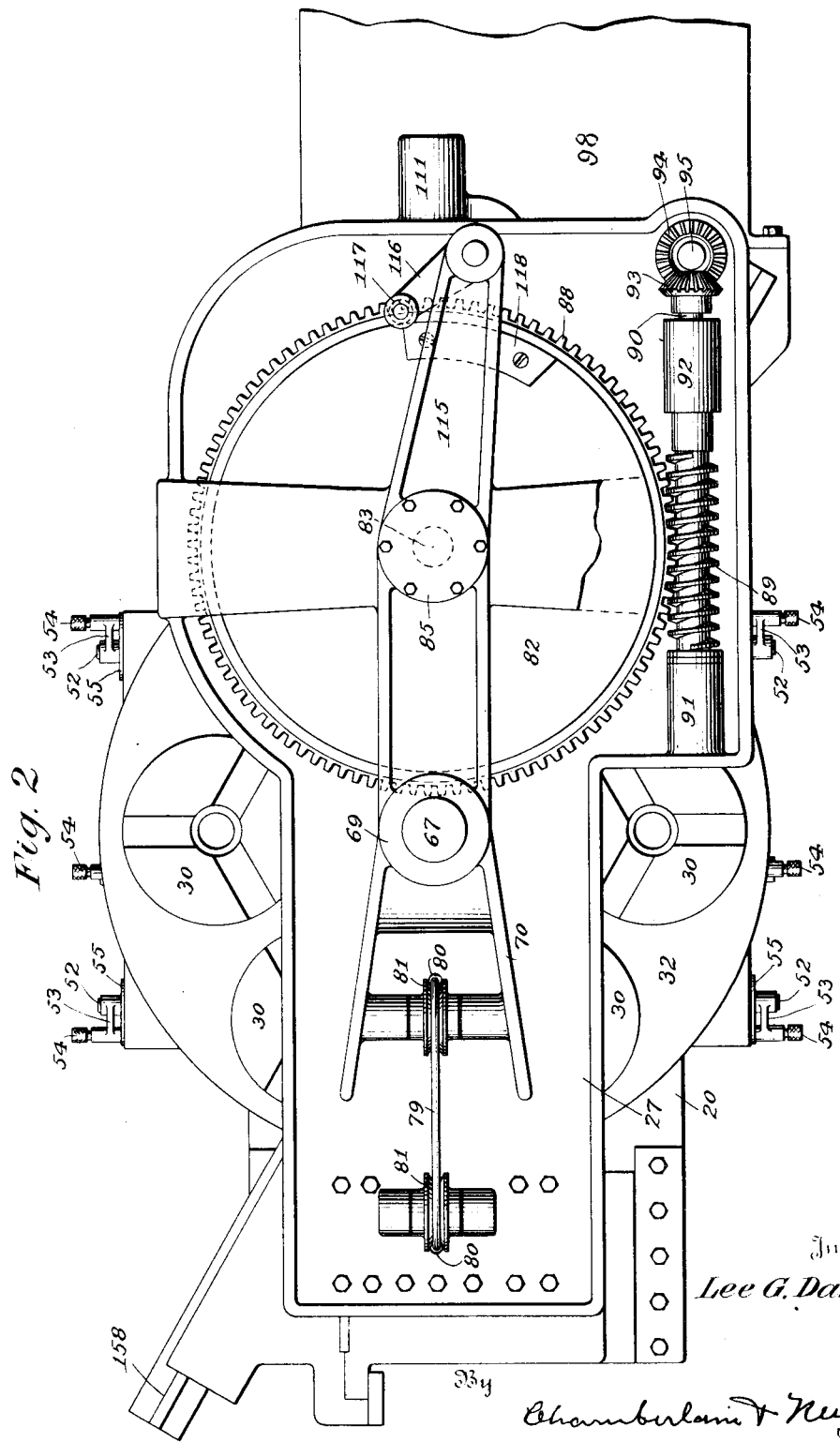
Fig. 2 is a top plan view on a slightly enlarged scale.

Upon the shaft 40 there are mounted gears 45 and 46 one above the other, the gear 46 being relatively larger than the gear 45, and grouped around the shaft 40 and at equal distances therefrom, and from one another, there are provided a series of rotatable spindles 47. Upon the lower portions of the spindles 47 opposite the gears 45 and 46 gears 48 and 49 are splined and adapted to slide vertically, a collar 50 being loosely mounted on each spindle beneath the gears, and engaged by forked arms 51 mounted on shafts 52, which extend horizontally through the base of the machine. The shafts 52 each have an operating crank 53 on their outer ends provided with a pin 54 for entering sockets 55 provided in the wall of the base, as clearly shown in Fig. 1. There are as many of these shafts as there are spindles, three being preferably provided at the front of the base and three at the rear thereof, and each shaft is capable of three adjustments as indicated in Fig. 1, one socket indicating the adjustment for one gear and one speed, another socket for another gear and speed, and the intermediate socket for the neutral position, and in which latter position the gears 48 and 49 are disposed between and out of mesh with the gears 45 and 46 so that the spindle 47 is stationary. With this mechanism the operator is enabled to operate the rotary spindles 47 at two different speeds, and may operate all of them at the same time, or any number of them as desired.

The spindles 47 correspond in number and position to the chuck spindles 31, being arranged opposite and adjacent thereto in the work positions of the chucks. For the purpose of driving the latter each spindle 31 is provided with gears 56 and 57 secured thereto and adapted to mesh with pinions 58 and 59 splined upon the adjacent spindle 47. These gears and pinions vary in size to enable the operator to adjust them to revolve the chucks and spindles at different speeds. Each chuck and spindle is operable independently of all the other chucks and their spindles, and consequently one or more of them may be operated at one speed while the others are simultaneously operated at another speed. The pinions 58 and 59 may be raised and lowered by any suitable means. Preferably there is provided a sleeve 60 on each spindle 47 having its upper end rotatably connected with the hub of the pinions and provided on its outer surface with a series of rack teeth engaged by a pinion 62, the shaft of which is provided with a squared end for engagement by a suitable operating tool adapted to be inserted through an opening 62ª in the work carrier 32. A leaf spring stop 63 (Fig. 3ª), normally engages the teeth of the pinion and locks it against revolution, thereby retaining and supporting the pinions 58 and 59 in their adjusted position, the end of the spring adapted to be engaged by the wrench to disengage it during adjustment. This adjustment when once made for a certain class of work, will be undisturbed generally, the speed of the chucks being affected by speed changing mechanism hereinafter more fully described.

Upon the upper end of the column 21 and beneath the super-structure 27 there is mounted for vertical sliding movement a cylindrical tool carrier 64 having a cross bar 65 secured at its upper end and engaging vertical guide slots 66 in opposite sides of the column. A vertical upwardly extending shaft 67 is secured to the hub portion 68 of the cross bar 65 within the column and extends upwardly therefrom, its upper end being slidably engaged in a bearing 69 provided in the transverse upper end of a standard 70 mounted upon the super-structure 27.

The tool carrier is also provided with a cross head 71 having channel portions 72 at its ends slidably engaging guide ways 73 of the standards 25 and 26 and co-operating with the guide slots 66 to prevent rotary movement from being imparted to the tool carrier. The tool carrier is preferably of hexagonal cross section and each of its hexagonal faces is provided with grooves 74, in which tool holders 75 are vertically slidable and capable of vertical adjustment by means of screws 76, mounted in the cross heads and having their upper ends squared for engagement by a wrench, and having lock-nuts 77 thereon for fixing the same in adjusted relation. It will be understood that tools may be mounted on the tool holders in any suitable relation depending upon the particular requirements for the work being performed. The tool carrier is counterbalanced, and yieldably held in its raised position by means of a weight 78, disposed within the hollow of the standard 25, and connected to the cross head by means of a cable 79 extending through openings 80 in the super-structure 27 and over rollers 81 mounted on said structure.

For the purpose of reciprocating the tool carrier there is mounted upon the super-structure and at one side of the shaft 67 a cam carrier 82, the vertical shaft 83 of which is journaled in bearings 84 and 85 provided respectively in the base of the super-structure and in the transverse upper portion of the standard 70 thereof. The groove 82ᵃ of the cam carrier 82 is engaged by a roller 86 provided on an enlargement or collar 87 of the shaft 67, and as the cam is continuously revolved the tool carrier and tools mounted thereon are vertically reciprocated, the rise, fall and level portions of the cam being so designed as to bring the tools into relation with the work upon the rotary chucks, and to feed the tools in proper timed relation for the particular work being done.

The cam carrier 82 is provided at its lower portion with a circumferential worm gear 88, engaged by a worm pinion 89, provided upon a horizontal shaft 90 journaled in suitable bearings 91 and 92 formed upon the super-structure 27, and provided at one end with a beveled pinion 93 meshing with a beveled pinion 94 provided upon the upper end, in a vertical shaft 95 journaled beneath said pinion in suitable bearing 96 provided therefor in the super-structure, and at its lower end in a bearing 97 provided in a gear housing 98 secured at one side of the base 20, said shaft 95 adapted to be continuously driven by mechanism which will presently be described.

From the foregoing it will be seen that the cam 82 is continuously driven during the operation of the machine to reciprocate the tool carrier; and for the purpose of indexing a rotatable chuck or work carrier, mechanism is provided which is operated through the rotation of the cam carrier 82 thereby providing an accurately timed driving relation between the several co-operative elements of the machine. This mechanism comprises a vertical shaft 99 disposed within the hollow of the standard 26 and journaled in bearings 100 and 101 provided upon the upper and lower ends of said column, and upon the upper end of said shaft there is secured a cross arm 102 having two diametrically projecting portions adapted to be successively and intermittently engaged by means of a roller 103 secured upon the under side of the cam carrier 82, to impart a half revolution to the shaft 99 during each complete revolution of the cam. At the lower end of the shaft 99 there is provided a gear 104 which meshes with the ring gear 39 of the rotary chuck carrier, the half revolution of the shaft 99 adapted through said gear to impart rotary movement to the carrier equal to the distance from one station to the next.

It will be noted that the cross arm 102 has two finished faces, so that as the roller comes into contact therewith it pushes it ahead of the roller, starting slowly and gradually moving faster as the roller moves toward the center of the cross arm, and then gradually slowing down the movement until the roller moves out of contact with the arm. This permits of the effective disengagement and reengagement of the chuck operating gear.

At the base of the column 26 there is slidably mounted in a suitable passage 105 a lock-pin 106, the tapered end 107 of which is adapted to be intermittently engaged with a series of sockets 108 provided in the periphery of the work carrier to retain the same in the working positions, and to be intermittently disengaged therefrom during the movement of the work carrier.

The lock-pin is normally engaged with one of the sockets 108 through the action of a spring 109 coiled about the shank portion 110 thereof, and bearing at its ends upon the shouldered end of the stop pin and the end of a guide member 111, within which said shank is slidable. For the purpose of intermittently retracting the stop pin during the rotation of the work carrier, the shank 110 is provided with rack teeth 112, which are engaged by a pinion 113 provided at the lowered end of a vertical shaft 114, which shaft extends upwardly through the base of the super-structure 27 and is journaled at its upper end in an arm 115 formed upon the transverse upper portion of the standard 70. Beneath the arm 115 the shaft 114 is provided with a trip lever 116, the rollered end 117 of which is adapted to be engaged by a trip cam 118 provided upon the upper surface of the cam carrier 82, so that during each revolution of said cam 82 the trip lever 116 is moved outwardlly, thereby rotating the shaft 114 and retracting the lock-pin 106 against the pressure of the spring 109, the lock-pin thereupon moving into the next socket 107 of the work carrier as the latter comes to rest after its intermittent rotary movement.

The driving mechanism for the machine is mounted within the gear housing 98 and consists of a horizontal main drive shaft 119 journaled within suitable bearings in the upright end walls of said housing and being disposed at one side of the chuck spindle rotating shaft 44 which is also extended into and has bearing within said housing. The driving motor 120 is mounted upon the upper side of the housing 98 and drives the shaft 119 through a chain-belt 121 extending over the sprocket wheel 122 secured upon said drive shaft.

A gear 123 is mounted upon the shaft 119 which meshes with and drives a gear 124 provided on a counter drive shaft 125 journaled in bearings 126 and 127 in the ends of the gear housing and extends at its outer end into a change gear box 128 provided at the end of the gear housing and having a removable cover, said extended end being provided within said gear box with a removable gear 129 meshing with and driving a removable gear 130, provided on the end of a shaft 131, journaled at one end in a bearing 132 of the housing and at its other end in a bearing 133 provided on the side wall of the housing. A beveled gear 134 is provided on the shaft 131 and meshes with a beveled gear 135 provided at the lower end of the shaft 95. The shaft 95 and the cam 82 are thus continuously driven during the operation of the machine, and the relative speed thereof may be changed as desired by removing the gears 129 and 130 and substituting therefor gears of different ratio.

The end of the drive shaft 119 extends into the change gear box 128, and is provided with a removable gear 136 which meshes with and drives a removable gear 137 provided upon the end of a shaft 138 disposed beneath the drive shaft, and journaled at one end in the end wall of the gear housing and at its other end in a bearing 139 of the vertical wall 140 of the base 20, said wall being also provided with a bearing 141 in which the shaft 44 of the pinion 43 is journaled. A pinion 142 is provided on the shaft 138 which meshes with and drives a gear 143 provided at one end of a sleeve 144 loosely rotatable on the shaft 44 and which is adapted, as will hereinafter appear, to be automatically clutched to said shaft to drive the chuck operating spindles during the stationary or working periods of the carrier, and disconnected during the movements of the carrier from one work station to the next.

For this purpose the sleeve 144 is provided with an interiorly tapered clutch drum 145, within which is disposed a co-operating tapered clutch member 146 provided at the end of a sleeve 147 splined upon the shaft 44 for sliding movement thereon, and normally held in engagement with said clutch drum by means of spring 148 coiled about the shaft and bearing at its ends upon said sleeve and upon a collar 149 fixed to the shaft. The sleeve 144 is provided with an annularly grooved portion 150 at its outer end within which are engaged the roller ends of a forked bell crank lever 151 pivotally mounted in bearings 152 provided on the inner wall of the housing, the upper arm of said lever being extended through an opening 153 in said housing and provided at its end with a roller 154 engaging a cam 155 provided on the under side of the work carrier indexing gear 104. The cam 155 is adapted during the rotation of said gear 104—that is, during the indexing movement of the carrier—to rotate the bell crank lever, thereby shifting the sleeve 144 against the force of the spring 148, and disengaging the clutch member 146 from the clutch drum 145, to thereby stop the drive of the shaft 44 and rotation of the chuck spindles. In order to cause the immediate stopping of said shaft upon release of the clutch, an annular tapered brake member 156 is provided upon the sleeve 144 which engages a co-operating annular tapered brake ring 157 secured within an opening of the inner wall of the housing, the outward or clutch releasing movement of the sleeve applying the brake to immediately stop the rotation of the shaft, while the inward movement, which takes place as the gear 104 comes to rest and the bell crank is engaged with the depressed portion of the cam, disengages the brake and connects the clutch to cause resumption of rotation of the chuck spindles.

As above pointed out, the stoppage of the rotation of the chuck driving spindles during the indexing of the carrier prevents clashing and consequent danger of breaking or chipping the gears as they are brought into mesh with each other.

The machine in addition to the vertical tool carrier is also preferably provided with horizontal tool slides, and in the present embodiment there are shown two such horizontal slides 158 mounted upon the vertical standards 25 and 26. The mechanism for operating each of these slides consists of a lever 159 pivotally mounted in a bracket 160 provided on the standard, and connected at one end with the cross head 71 of the vertical tool carrier by a link 161, the other end being provided with a segment 162 which meshes with a bevel gear 163 provided at the upper end of a shaft 164 journaled in the bracket, the lower end of said shaft having a gear 165 provided thereon which meshes with a rack 166 on the tool slide. Thus the forward and downward reciprocation of the vertical tool carrier imparts outward and inward movement to the horizontal tool slide.

The operation of the machine is as follows:—

One of the stations, preferably the forward station as shown in Fig. 1, may serve as a loading and unloading station, and for this purpose the vertical tool carrier is not provided with tools above the chuck at this station, so that the operator will have a free space above the chuck to mount and remove the work. At this point also the chuck spindle operating gears 48 and 49 are moved to neutral position by means of the operating crank 53, so that during the stationary periods of the carrier, and while the chucks at the other stations are rotating in co-operation with the lowered tools upon the tool carrier, the chuck at the loading and unloading station is stationary.

It will be understood that while the operator is loading the stationary chuck the vertical and lateral tool carriers are moved into and out of relation with the remaining revolving chucks through the action of the cam groove 82$^a$ on the cam carrier 82. At a predetermined point in the retracting movements of the tool carriers the trip cam 118 at the upper side of the cam carrier 82 engages the trip lever 116, thereby retracting the lock pin 106 to release the work carrier, and thereupon the roller 103 at the lower side of said cam carrier contacts with the arm 102 rotating it through a half revolution, and through the gear 104 indexes the work carrier to advance the chucks to a new station. At the completion of the indexing movement the lock pin 106 engages the next socket 108 to fix the position of the work carrier. During the indexing operation the gears 56 and 57 of the chuck spindles will move out of mesh with the driving pinions 58 and 59, and rotation of these pinions will be stopped as the cam 155 at the under side of the gear 104 rotates the bell crank lever 151 to disconnect the clutch 146 and apply the brake 156, the clutch being again connected and the brake released as the work carrier comes to rest. The chuck driving gears being stationary as the chuck gears come into mesh therewith, chattering and possible breakage of the gears is entirely eliminated.

I have illustrated and described a preferred and satisfactory embodiment of the invention but it is obvious that changes may be made therein within the spirit and scope thereof as defined in the appended claims.

Having thus described my invention, what I claim and desire to secure by Letters Patent is—

1. In a multiple spindle lathe, a base, a rotatable multiple spindle work carrier a plurality of work spindles carried thereby, a super-structure mounted above said base, a movable tool carrier disposed between said super-structure and said multiple spindle work carrier, a plurality of tool supports on said tool carrier for said spindles, and a single rotary element mounted on said super-structure adapted to move said tool carrier into and out of relation with said multiple spindle work carrier, said rotary element and work carrier being driven from the same source of power, the one intermittently and the other continuously.

2. In a multiple spindle lathe, a base, a rotatable multiple spindle work carrier a plurality of work spindles carried thereby, a super-structure mounted above said base, a cross-head a movable tool carrier mounted on said cross-head between said super-structure and said multiple spindle work carrier, a plurality of tool supports on said tool carrier for said spindles, means associated with said cross-head for counterbalancing said tool carrier, a single continuously rotating actuating member mounted on said super-structure, and means driven thereby adapted to move said tool carrier into and out of relation with said multiple spindle work carrier.

3. In a multiple spindle lathe, a base, a rotatable multiple spindle carrier a plurality of work spindles carried thereby, a super-structure mounted above said base, a movable tool carrier disposed between said super-structure and said multiple spindle work carrier, a plurality of tool supports on said tool carrier for said spindles, a single rotatable cam mounted on said super-structure and means driven by said cam adapted to move said tool carrier into and out of relation with said multiple spindle work carrier, said means having an adjustable connection with the cam.

4. In a multiple spindle lathe, a base, a rotatable multiple spindle work carrier, a super-structure mounted above said base, a movable tool carrier disposed between said super-structure and said multiple spindle work carrier, a single rotatable cam mounted on said super-structure, means driven by said cam adapted to move said tool carrier into and out of relation to said multiple spindle work carrier, and means driven by said cam adapted to rotate said multiple spindle work carrier.

5. In a multiple spindle lathe, a base, a rotatable multiple spindle work carrier adapted to have step-by-step movement, a super-structure mounted above said base, a movable tool carrier disposed between said super-structure and said multiple spindle work carrier, a single rotatable cam mounted on said super-structure, means driven by said cam adapted to move said tool carrier into and out of relation to said multiple spindle work carrier, and means driven by said cam adapted to intermittently index said multiple spindle work carrier.

6. In a multiple spindle lathe, a revolving work carrier provided with a circumferential ring gear, work supporting spindles mounted therein, a tool carrier adapted to co-operate with said spindles, and indexing means for intermittently rotating said work carrier and comprising a gear meshing with said ring gear, a single continuously revolving cam carrier, operative connections between the cam carrier and gear whereby the work carrier is intermittently rotated.

7. In a multiple spindle lathe, a revolving work carrier provided with a circumferential ring gear, work supporting spindles mounted therein, a tool carrier adapted to co-operate with said spindles, and indexing means for intermittently rotating said work carrier and comprising a gear meshing with said ring gear, a single continuously revolving cam carrier, operative connections between the cam carrier and gear whereby the work carrier is intermittently rotated and operative connections of the tool carrier with the cam carrier for reciprocating the former.

8. In a machine of the character described, a base, a center column thereon, a multiple spindle work carrier having intermittent movements and provided with a circumferential ring gear and rotatable around the center column, a reciprocating tool carrier mounted on said center column, a revolving cam carrier mounted above the tool carrier and connected therewith to operate the same, an indexing means for intermittently rotating said work carrier and comprising a gear meshing with said ring gear, and means connecting the cam carrier and gear to intermittently operate the work carrier.

9. In a multiple spindle lathe, a base, a central column mounted thereon, standards projecting upwardly from the carrier, a super-structure mounted on said standards, a tool carrier movable on said column between said standards, a single vertical rotatable cam mounted on said super-structure, and means driven by said cam and operating downwardly through said center column to reciprocate said tool carrier.

10. In a multiple spindle lathe, a revolving work carrier having intermittent movement, a plurality of revolving work carrying spindles mounted therein, a superstructure mounted above said work carrier a reciprocating tool carrier mounted between said work carrier and superstructure, and continuously rotatable means mounted on said superstructure adapted to move said tool carrier, to revolve said work carrier intermittently, and to positively operate through means of gearing, a spring pressed slidably mounted locking bolt adapted to lock said work carrier in its stationary postions.

11. In a multiple spindle lathe, a revolving work carrier having intermittent movement, a plurality of revolving work carrying spindles mounted therein, a superstructure mounted above said work carrier a reciprocating tool carrier mounted between said work carrier and superstructure, a single continuously rotating cam carrier mounted on said superstructure, and means co-operating therewith adapted to move said tool carrier, revolve said work carrier intermittently and in a positive manner and to retract a spring pressed bolt which is adapted to lock said work carrier in its stationary positions.

12. In a multiple spindle lathe, a revolving work carrier having intermittent movement, a plurality of revolving work carrying spindles mounted therein, a reciprocating tool carrier, a continuously rotating cam carrier, and means co-operating therewith adapted to move said tool carrier, revolve said work carrier intermittently and lock said work carrier in its stationary positions, and intermittently operating means adapted to rotate said work carrying spindles during said stationary positions of the work carrier.

13. In a multiple spindle lathe, a revolving work carrier having intermittent movement, a plurality of revolving work carrying spindles mounted therein, a reciprocating tool carrier, a super-structure mounted above said tool carrier, a continuously rotating actuating member mounted on said super-structure, and means co-operating therewith adapted to move said tool carrier, revolve said work carrier intermittently, and lock said work carrier in its stationary positions.

14. In a multiple spindle lathe, a revolving work carrier having intermittent movement, a plurality of work supporting spindles mounted therein, each being mounted to revolve on its axis independently of one another, a plurality of rotating spindle driving means, one for each spindle, having stationary axes and adapted to co-operate with said spindles to drive them in the intervals between the intermittent movements of said work carrier, vertically movable tool means, continuously revolving means for controlling the movements of said tool means, friction brake means adapted to stop the rotation of said spindle driving means during the said movements of the carrier and means actuated by said continuously revolving means adapted to actuate said brake means.

15. In a multiple spindle lathe, a revolving work carrier having intermittent movement, a plurality of work supporting spindles mounted therein, each being mounted to revolve on its axis independently of one another, gear means mounted on said spindles, a plurality of rotating spindle driving means, one for each spindle, having stationary axes, gear means on said spindle driving means adapted to mesh with said gears of said spindles to drive them in the intervals between the intermittent movement of said carrier and to be moved out of mesh during said movements, vertically movable tool means, continuously revolving means for controlling the movements of said tool means, friction brake means adapted to stop the rotation of said spindle driving means during said movements of the carrier, and means actuated by said continuously revolving means adapted to actuate said brake means.

16. In a multiple spindle lathe, a revolving work carrier having intermittent movement, a plurality of work supporting spindles mounted therein, each being mounted to revolve on its axis independently of one another, a plurality of rotating spindle driving means, one for each spindle, having stationary axes and adapted to co-operate with said spindles to drive them in the intervals between the intermittent movement of said carrier, driving means for simultaneously driving said spindle driving means, vertically movable tool means, continuously revolving means for controlling the movements of said tool means, friction clutch means adapted to disconnect said driving means during the intermittent movements of said work carrier, and means actuated by said continuously revolving means adapted to actuate said clutch means.

17. In a multiple spindle lathe, a revolving work carrier having intermittent movement, a plurality of work supporting spindles mounted therein, each being mounted to revolve on its axis independently of one another, a plurality of rotating spindle driving means, one for each spindle, having stationary axes and adapted to co-operate with said spindles to drive them in the intervals between the intermittent movements of said carrier, driving means adapted to simultaneously rotate said spindle driving means, indexing means for said carrier adapted to intermittently move it, and means actuated by said indexing means adapted to stop the drive of said spindle driving means during the intermittent movements of said work carrier.

18. In a multiple spindle lathe, a revolving work carrier having intermittent movement, a plurality of work supporting spindles mounted therein, each being mounted to revolve on its axis independently of one another, a plurality of rotating spindle driving means, one for each spindle, having stationary axes and adapted to co-operate with said spindles to drive them in the intervals between the intermittent movements of said carrier, driving means adapted to simultaneously rotate said spindle driving means and a clutch adapted to disconnect said driving means during the movements of said work carrier.

19. In a multiple spindle lathe, a revolving work carrier having intermittent movement, a plurality of work supporting spindles mounted therein, each being mounted to revolve on its axis independently of one another, a plurality of rotating spindle driving means, one for each spindle, having stationary axes and adapted to co-operate with said spindles to drive them in the intervals between the intermittent movements of said carrier, drive means for simultaneously driving said spindle driving means, indexing means for said work carrier adapted to intermittently rotate said work carrier, and means adapted to be actuated by said indexing means to disconnect said drive means during the intermittent rotation of said work carrier.

20. In a multiple spindle lathe, a revolving work carrier having intermittent movement, a plurality of work supporting spindles mounted therein, each being mounted to revolve on its axis independently of one another, a plurality of rotating spindle driving means, one for each spindle, having stationary axes and adapted to co-operate with said spindles to drive them in the intervals between the intermittent movements of said work carrier, drive means for simultaneously driving said spindle driving means, means adapted to disconnect said driving means during the intermittent movement of said work carrier, and brake means adapted to be applied to said spindle driving means upon disconnection of said drive means.

21. In a multiple spindle lathe, a revolving work carrier having intermittent movement, a plurality of work supporting spindles mounted therein, each being mounted to revolve on its axis independently of one another, a plurality of rotating spindle driving means, one for each spindle, having stationary axes and adapted to co-operate with said spindles to drive them in the intervals between the intermittent movements of said work carrier, drive means for simultaneously driving said spindle driving means, rotatable indexing means for intermittently rotating said work carrier, means for disconnecting said drive means from said spindle driving means, and a cam carried by said indexing means adapted to actuate said last means during the intermittent movements of said work carrier.

22. In a multiple spindle lathe, a revolving work carrier having intermittent movement, a plurality of work supporting spindles mounted therein, each being mounted to revolve on its axis independently of one another, a plurality of rotating spindle driving means, one for each spindle, having stationary axes and adapted to co-operate with said spindles to drive them in the intervals between the intermittent movements of said carrier, drive means for simultaneously driving said spindle driving means, rotatable indexing means for intermittently rotating said work carrier, means for disconnecting said drive means from said spindle driving means and simultaneously braking said spindle driving means, and cam means carried by said indexing means adapted to actuate said last means during the intermittent movements of said work carrier.

23. In a multiple spindle lathe, a revolving work carrier having intermittent movement, a plurality of work supporting spindles mounted therein, means for varying the speed of rotation of said spindles on their axes independently of one another, and means for driving said spindles simultaneously, and change gears adapted to drive said last means at different speeds and means for holding the spindle driving means against movement during rotation of the work carrier.

24. In a multiple spindle lathe, a revolving work carrier having intermittent movement, work supporting spindles mounted therein, a single tool carrier, tools carried thereby for said respective spindles a continuously driven drive shaft, single means for moving said tool carrier, means driven by said drive shaft adapted to actuate said last means, and said single means controlling the operation of the means for moving the work carrier.

25. In a multiple spindle lathe, a base, a revolving work carrier having intermittent movement, work supporting spindles mounted thereon, a super-structure, a tool carrier, a continuously driven drive shaft, means in said base adapted to be driven by said drive shaft to rotate said spindles, means mounted on said super-structure for moving said tool carrier, and means driven by said drive shaft adapted to actuate said last means.

26. In a multiple spindle lathe, a base, a revolving work carrier having intermittent movement, work supporting spindles mounted thereon, a single tool carrier, tools carried thereby for said respective spindles, a continuously driven drive shaft, means including a clutch mechanism driven thereby for driving said spindles, a single cam carrier, cam means on said cam carrier for moving said tool carrier, means driven by said drive shaft adapted to continuously rotate said cam carrier and means operated by said cam carrier for disconnecting the elements of said clutch mechanism at intervals.

27. In a multiple spindle lathe, a base, a revolving work carrier having intermittent movement, work supporting spindles mounted therein, a tool carrier, a continuously driven drive shaft, means driven thereby for driving said spindles, a cam carrier, means driven by said drive shaft adapted to continuously rotate said cam carrier, cam means provided thereon for moving said tool carrier, indexing means for intermittently indexing said work carrier, and means carried by said cam carrier adapted to intermittently actuate said indexing means.

28. In a multiple spindle lathe, a base, a revolving work carrier having intermittent movement, work supporting spindles mounted therein, a tool carrier, a continuously driven drive shaft, means driven thereby for driving said spindles, a cam carrier, means driven by said drive shaft adapted to continuously rotate said cam carrier, indexing means for intermittently indexing said work carrier, means carried by said cam carrier adapted to intermittently actuate said indexing means and means actuated by said indexing means adapted to disconnect said spindle driving means during the indexing movements of said work carrier.

29. In a multiple spindle lathe, a base, a revolving work carrier having intermittent movement, work supporting spindles mounted therein, a tool carrier, a continuously driven drive shaft, means driven thereby for driving said spindles, a cam carrier, means driven by said drive shaft adapted to continuously rotate said cam carrier, indexing means for intermittently indexing said work carrier, means carried by said cam carrier adapted to intermittently actuate said indexing means, locking means for said work carrier adapted to be engaged and disengaged therewith during the stationary and moving periods of said work carrier, and means carried by said cam carrier adapted to intermittently actuate said locking means.

30. In a multiple spindle lathe, a base, a revolving work carrier having intermittent movement, work supporting spindles mounted therein, a tool carrier adapted to move into and out of relation with said work supporting spindles, a superstructure mounted above said work carrier, means geared to said work carrier for rotating it, indexing means mounted on said superstructure for intermittently rotating said last named means and work carrier and adapted to rotate the same with gradually increasing and decreasing speed, whereby the initial and final indexing movement is relatively slow and the intermediate indexing movement is relatively fast.

31. In a multiple spindle lathe, a base, a revolving work carrier having intermittent movement, work supporting spindles mounted therein, each being mounted to revolve on its axis independently of one another, a plurality of spindle driving means, one for each spindle, having stationary axes and adapted to co-operate with said spindles to drive them in the intervals between the intermittent movements of the carrier, a superstructure mounted above said work carrier, means geared to said work carrier for rotating it, and rotating said last means and indexing means for intermittently indexing said work carrier adapted to rotate the same with gradually increasing and decreasing speed whereby the initial and final indexing movements are relatively slow and the intermediate indexing movement is relatively fast.

32. In a multiple spindle lathe, a revolving work carrier having intermittent movement, a plurality of work supporting spindles mounted therein, each being mounted to revolve on its axis independently of one another, gear means mounted on said spindle, a plurality of rotating spindle driving means, one for each spindle, having stationary axes, gear means on said spindle driving means adapted to mesh with said gears of said spindles to drive them in the intervals between the intermittent movements of said carrier, a superstructure mounted above said work carrier, means geared to said work carrier for rotating it, and indexing means for intermittently rotating said last means and indexing said work carrier adapted to rotate the same with gradually increasing and decreasing speed whereby the initial and final indexing movements are relatively slow and the intermediate indexing movement is relatively fast.

33. In a multiple spindle lathe, a revolving work carrier having intermittent movement, a plurality of work supporting spindles mounted therein, each being mounted to revolve on its axis independently of one another, gear means mounted on said spindle, a plurality of rotating spindle driving means, one for each spindle, having stationary axes, gear means on said spindle driving means adapted to mesh with said gears of said spindles to drive them in the intervals between the intermittent movements of said carrier and to be moved out of mesh during said movements, and means adapted to stop the rotation of said rotating spindle driving means during said movements of the carrier, a superstructure mounted above said work carrier, means geared to said work carrier for rotating it, indexing means for intermittently rotating said last means and indexing said work carrier adapted to rotate the same with gradually increasing and decreasing speed whereby the initial and final indexing movements are relatively slow and the intermediate indexing movement is relatively fast.

34. In a multiple spindle lathe, a revolving work carrier having intermittent movement and provided with a circumferential ring gear, work supporting spindles mounted therein, a tool carrier adapted to co-operate with said spindles, and indexing means for intermittently rotating said work carrier and comprising a gear meshing with said ring gear, an arm radially secured with respect to the axis of said last gear and a continuously rotating member having means adapted to intermittently engage said arm to rotate said gear and index said carrier, said last means first engaging the extremity of said arm and moving toward the axis and then moving from the axis toward the extremity and whereby the indexing movement is of gradually increasing and decreasing speed.

35. In a multiple spindle lathe, a base, a multiple spindle work carrier, a plurality of work spindles carried thereby, upright side columns and a center column, on said base, a sliding tool carrier on the center column, a plurality of tool supports on said tool carrier for said spindles, a cross member carried by and connecting the said columns together, and a continuously revolving cam carrier mounted on the said cross member and means actuated by said cam carrier and operating downwardly through said center column for moving the sliding tool carrier towards and from the spindles.

36. In a multiple spindle lathe, a base, a multiple spindle work carrier adapted to have intermittent movement, upright side columns and a center column mounted on said base, a sliding tool carrier on the center column, a cross member carried by and connecting the said columns together, locking means for said multiple spindle work carrier, a continuously revolving cam carrier mounted on the said cross member for moving the sliding tool carrier towards and from the spindles, and means carried by the continuously revolving cam carrier for connecting and disconnecting said locking means with said multiple spindle work carrier.

37. In a multiple spindle lathe, a base, a multiple spindle work carrier adapted to have intermittent movement, upright side columns and a center column mounted on said base, a sliding tool carrier on the center column, a cross member carried by and connecting the said columns together, indexing means for said multiple spindle work carrier, locking means for locking said carrier during its stationary periods, a continuously revolving cam carrier mounted on said cross member for moving said sliding tool carrier towards and from the spindles, and means carried by said continuously revolving cam carrier for actuating said indexing means and said locking means.

38. In a multiple spindle lathe, a base, upright side columns and a center column thereon, a multiple spindle work carrier mounted to revolve on said base and around the center column, a plurality of work spindles carried thereby, a tool carrier mounted to reciprocate on the center column, a plurality of tool supports on said tool carrier for said spindles, a member supported by the columns, and continuously revolving means carried by said member and adapted to reciprocate said tool carrier, said tool carrier including a cross-head mounted on said center column and held against turning movement thereby.

39. In a multiple spindle lathe, a base, upright side columns and a center column thereon, a multiple spindle work carrier mounted to revolve on said base and around the center column, a reciprocatory tool carrier on the center column, indexing means for intermittently rotating said multiple spindle carrier, locking means for locking said carrier in the intervals between its intermittent movements, a member supported by the columns and continuously revolving means carried by said member and adapted to reciprocate said tool carrier and intermittently actuate said indexing and locking means.

40. In a multiple spindle lathe, a base, upright side columns and a center column thereon, a multiple spindle carrier, a sliding tool carrier mounted on said center column, a cross member supported by and connecting the columns together, a cam carrier mounted on the cross member, a shaft disposed within the center column and connected to said tool carrier and extending upwardly into said cross member, and roller on said shaft adapted to co-operate with said cam carrier to reciprocate the tool carrier.

41. In a multiple spindle lathe, a base, a multiple spindle work carrier, upright side columns, a center column, a sliding tool carrier mounted on said center column, a cross member supported by and connecting the columns together, a cam carrier mounted on the cross member for reciprocating the tool carrier, a gear box extending out from one side of the base, and continuously driven means extending up from the gear box and adapted to continuously drive said cam carrier.

42. In a machine of the character described, a base, upright side columns and a center column thereon, a multiple spindle work carrier mounted on the base and rotatable around the center column, a plurality of work spindles carried thereby, a reciprocating tool carrier including a tool carrier mounted on said center column, a plurality of tool supports on said tool carrier for said spindles, a member supported by and connecting the columns together, and a revolving cam carrier mounted on said member and adapted to reciprocate said tool carrier, said cross-head and center column having interfitting parts preventing rotation of the cross-head.

43. In a machine of the character described, a base, upright side columns and a center column thereon, a multiple spindle work carrier mounted on said base and rotatable around said center column, a member supported by and connecting said columns together, indexing means for said multiple spindle carrier, locking means for said multiple spindle carrier, a revolving cam carrier mounted on said member, and means carried thereby for reciprocating the tool carrier and actuating said indexing and locking means.

44. In a multiple spindle lathe, a base, upright side columns and a center column thereon, a multiple spindle work carrier surrounding said center column and adapted to have intermittent indexing movement, a tool carrier mounted for reciprocation on said center column, a member supported by the columns, and continuously revolving means carried by said member and adapted to reciprocate said tool carrier and index said multiple spindle carrier.

45. In a machine of the character described, a base, upright side columns and a hollow center column thereon, a multiple spindle carrier adapted to be indexed around said center column, a plurality of work spindles carried thereby, a reciprocating tool carrier mounted on said center column, a plurality of tool supports on said tool carrier for said spindles, a member supported on said columns and connecting them together, a cam drum mounted on said member, and cam means carried thereby and adapted to reciprocate the tool carrier, said cam drum reciprocating the tool carrier through the medium of a rod operating through said center column.

46. In a multiple spindle lathe, a base, upright side columns, a center column, a multiple spindle carrier adapted to be indexed around said center column, a member supported by said columns and connecting them together, indexing means for indexing said multiple spindle carrier, locking means for locking said carrier in the intervals between its indexing movements, a cam drum mounted on said member, and a plurality of means carried thereby for respectively reciprocating said tool carrier and actuating said indexing and locking means.

47. In a multiple spindle lathe, a base, a carrier mounted to rotate thereon and having a series of work spindles, upright side columns, a reciprocating tool carrier positioned between said upright columns, a plurality of tool supports on said tool carrier for said spindles, a cross frame member carried on and connecting said side columns together, a rotatable cam mounted upon said cross frame member, and connections between the cam and slidable tool carrier for feeding the latter toward and from the work spindles, said side columns and tool carrier being provided with interfitting means preventing rotation of the carrier.

48. In a multiple spindle lathe, a base, a rotary carrier mounted thereon, a plurality of work tables mounted in the carrier, means for indexing the tables, upright side columns, a cross frame member carried on and connecting said columns together, a rotatable cam mounted above said frame member, a vertically movable tool carrying member positioned above the rotary carrier and adapted to receive its reciprocatory movements toward and from the work tables from said cam positioned above said tool carrier and a plurality of tool supports on said tool carrying member for said work tables, said tool carrier being mounted for free vertical movement and being held against horizontal movement by said side columns.

49. In a multiple spindle lathe, a base, upright side columns, a cross frame member carried by and connecting said side columns, a rotatable work carrier having a plurality of work tables, a tool carrier slidably mounted upon the upright columns and having free vertical movement relative thereto and being held against horizontal movement thereby, a plurality of tool supports carried by said tool carrier for said work tables, a rotatable cam mounted above the tool carrier and connected to the same to impart to it reciprocatory feeding movements to and from the work tables, side tool carrying means mounted upon each side column and adapted to engage the work upon other tables of the carrier, and means operated by the cam for indexing the carrier at predetermined points in its rotation and in relation to the movements of the cam.

50. In a multiple spindle lathe, a base, a rotary carrier mounted thereon, a plurality of work tables mounted in the carrier, upright side columns supported on the base, a frame structure carried upon and connecting said side columns together, an operating mechanism including a cam mounted in said upper frame structure, a vertically movable tool carrier mounted above the rotary carrier in movable engagement with the columns and having free vertical movement relative thereto and being held against horizontal movement thereby, and having its central vertical axis offset from the axis of said cam, and connected to be reciprocated by said cam, a plurality of tool supports carried by said tool carrier for said spindles, and means operated by the cam for indexing the carrier at predetermined points.

Signed at Bridgeport, in the county of Fairfield and State of Connecticut, this 22nd day of January, A. D., 1924.

LEE G. DANIELS.